March 1, 1927.

J. E. BELL 1,619,284

EVAPORATIVE CONDENSER

Filed Oct. 29, 1924

INVENTOR
John E. Bell
BY
Pennie, Davis, Marvin and Edmonds
ATTORNEYS

Patented Mar. 1, 1927.

1,619,284

UNITED STATES PATENT OFFICE.

JOHN E. BELL, OF BROOKLYN, NEW YORK, ASSIGNOR TO SINCLAIR REFINING COMPANY, OF CHICAGO, ILLINOIS, A CORPORATION OF MAINE.

EVAPORATIVE CONDENSER.

Application filed October 29, 1924. Serial No. 746,471.

This invention relates to an improved method and apparatus for cooling and condensing the distillate vapors from stills in which hydrocarbon oils are subjected to distillation. The invention includes improvements in both the method and apparatus.

In cooling and condensing the distillate vapors from oil stills, heat is abstracted from the hot vapors escaping from the still to cool the distilled vapors, to condense the vapors, and to cool the condensed distillate. Hitherto, in the methods generally employed, the distillate vapors have been cooled and condensed by absorbing heat therefrom in cooling water as sensible heat, for example, by passing the hot vapors from the still through a coil submerged in a relatively large body of cooling water or by bringing the hot vapors in indirect heat exchanging relation with a flowing stream of relatively cool water. In order to secure effective condensation of the oil vapors by such methods, it has been necessary to discharge the cooling water from the condenser at relatively low temperature and to employ large volumes of cooling water to maintain the low final temperature requisite to effective condensation.

According to the present invention, the oil vapors from the still are subjected to condensation in two stages, first at a higher temperature with the abstraction of a large amount of the heat of the vapors and second at a lower temperature whereby effective condensation is secured.

According to this invention, the oil vapors are first brought into indirect heat interchanging relation with a body of water at the boiling point and a part of the heat of the vapors is removed in boiling or evaporating the water, and the partially cooled vapors are then subjected to further cooling and condensation.

In one way of carrying out the process of the invention, the hot vapors from the still are first brought into heat interchanging relation with a relatively small volume of water which is thereby vaporized, and the partially cooled vapors are then further cooled and condensed by passing them in heat interchanging relation with a relatively large volume of cooling water without any substantial vaporization thereof. The second cooling and condensing treatment may be carried out in much the usual way, although the amount of cooling water employed therein may be materially reduced.

Water may be separately supplied to the first and second cooling and condensing treatments, or water from the second treatment, which has already been employed for absorbing heat as sensible heat, may advantageously be employed for carrying out the evaporative cooling. Sufficient cooling water is employed in the second cooling and condensing treatment to condense the vapors and to cool the condensed distillate to the desired temperature. Sufficient water is supplied to the first cooling treatment, either from the second treatment or from a separate source, to replace that which is evaporated.

The heat of vaporization of water is thus employed in the initial cooling of the vapors while effective condensation of the vapors is secured by the further cooling and condensation. Due to the initial cooling, less heat need be abstracted in the second cooling and condensation, and the vapors and condensate can be brought to a low final temperature with a materially reduced amount of cooling water in the second treatment. The heat of vaporization of water is high, about 970 B. t. u. per pound, and a pound of water evaporated produces a greater cooling effect than a pound of water can create by the absorption of sensible heat over any range of temperatures encountered in condensing oil vapors. In condensing a naphtha fraction from a direct fire heated crude still in the ordinary way, for example, the cooling water may be raised in temperature about 60° F., corresponding to the removal of about 60 B. t. u. per pound of water from the vapors and condensate, and in carrying out the present invention a saving in the amount of cooling water required (at the same initial temperature) of as much as 25% or more can be effected. With distillates including an increased amount of constituents boiling at higher temperatures, a corresponding increase in the saving of cooling water can be effected because a greater proportion of the heat in the oil vapors from the still can be absorbed in the evaporative cooling and condensing operation.

In carrying out the present invention the vapors at high temperature fresh from the still are employed to evaporate water whereby the latent heat of vaporization of the water is employed to cool the vapors and the partially cooled vapors are then further cooled and condensed at lower temperature, and the total amount of water employed to produce the same cooling effect, both as to the amount of heat removed and the final temperature of the vapors and condensate, is reduced due to the greater relative cooling effected by the water evaporated. Where waste cooling water from the second treatment is evaporated in the first, the additional heat required to raise this water from the temperature at which it is discharged from the second treatment is also extracted from the vapors in the first treatment. The present invention accordingly affords important advantages in the economy which it effects in the amount of cooling water required as compared with the methods commonly used.

The apparatus of the invention comprises a still, which may or may not be provided with a reflux or fractionating tower, and an evaporating condenser communicating with the vapor space of the still or with the reflux tower and discharging into a secondary condenser for completing the cooling and condensation of the vapors from the still.

In the apparatus of the invention, a passage having an extended heat exchanging surface may be arranged within a receptacle adapted to maintain a relatively small volume of water in contact with the passage and to provide a vaporizing surface for the water. The hot vapors from the still are passed through this passage, and are thereby brought into heat interchanging relation with the water, and the partially cooled distillate is then conducted to a secondary condenser. This secondary condenser may be of conventional construction and arrangement, although a considerably smaller condenser may be employed. Where a water cooled condenser of ordinary type is used, connections may be provided for maintaining the cooling water in the secondary condenser at a relatively low temperature by circulating cooling water therethrough. Connections may be provided for introducing water into the evaporative condenser either from the secondary condenser or from a separate source.

The receptacle in which the heat exchanging surfaces of the auxiliary evaporative condenser are arranged may be provided with means for promoting the escape of steam as the water is evaporated, in order to accelerate the evaporation of the water to promote and assist the cooling effected in the evaporative condenser. The operation of the evaporative condenser may also be controlled by regulating the escape of steam therefrom as the water is evaporated.

In carrying out the present invention, the temperature of the distillate can be reduced in the evaporative condenser, to a temperature somewhat above and approaching the boiling point of water. The heat absorbed in this condenser corresponds in amount to the heat given up therein by the vapors from the still. All of the distilled vapors may be cooled to this temperature by the evaporation of the water, and heavier constituents may be condensed in the evaporative condenser. Light fractions of low average boiling point may be cooled in the evaporative condenser and condensed in the secondary condenser, or intermediate fractions may be cooled and partly condensed in the evaporative condenser. The amount of heat that can be absorbed in the evaporative condenser depends in part upon the temperature of the vapors entering it, and increases with increasing vapor temperature; and the proportion of the cooling water employed and the relative amount of cooling effected in the evaporative condenser may be increased and the total amount of cooling water decreased as the temperature of the vapors escaping from the still increases.

The process and apparatus of this invention may be employed in cooling the distillate vapors from pressure stills. The vapors and gases escaping from pressure cracking stills are at a relatively high temperature, and may be more or less superheated (that is, heated to a temperature in excess of their boiling point under the prevailing pressure), and a corresponding amount of water may be evaporated by heat exchange therewith and a relatively larger proportion of the heat in the distillate vapors abstracted by the evaporative cooling thereby effected. The evaporative condenser may be operated at substantially the still pressure or at a lower pressure and the secondary condenser may be operated at the same pressure as the evaporative condenser or at a lower pressure.

The invention will be further described in connection with the accompanying drawing illustrating, somewhat diagrammatically and conventionally, one embodiment of the apparatus of the invention adapted for carrying out the process of the invention, but it will be understood that the invention is exemplified by this further description and illustration and is not limited thereto.

In the accompanying drawing:

Fig. 1 represents in elevation and partly in section a still and condenser embodying the invention; and Fig. 2 is a fragmentary sectional view.

The still illustrated is of the direct fire heated type and comprises a shell 1 arranged over a setting 2. Arranged above the still shell is a reflux tower 3. The reflux tower illustrated is of the general construction and operation described in a prior application filed April 1, 1924, Serial No. 703,338. The still is provided with a charging line 4, and connection 5 is arranged at the upper end of the tower for introducing feed into the still through the tower. The vapors escape from the top of the tower through a pair of vapor connections 6 arranged on opposite sides thereof.

The vapors escaping from the tower on the still pass through the vapor lines 6 to the headers 7 and thence through a series of horizontal tubes 8 to the return headers 9 and back to the headers 10 through another series of horizontal tubes 11. The headers 7, 9 and 10 and tubes 8 and 11 are arranged within a receptacle 12 adapted to contain a body of water submerging, or almost submerging, the tubes 8 and 11. The tubes 8 and 11 may be provided with flanges or a series of annular rings or may consist of special elements for increasing the amount of heat transferring surface. Water vapor liberated within the receptacle 12 escapes upwardly through the stack or flue 13, and openings 14 provided with dampers 15 are arranged in the upper part of the receptacle above the normal liquid level to permit a draft of air to be drawn in over the surface of the water in the receptacle by the escape of steam through the stack. Any hydrocarbon vapors escaping due to leakage escape with the steam.

From the headers 10, the partially cooled vapors escape to the secondary condenser through connections 16. In the condenser, the vapor, and condensate as it is formed, flow downwardly through a series of pipe coils 17 in heat interchanging relation with the cooling water in which they are immersed in the condenser box 18. The condenser discharges into the trap 19 from which the condensed distillate escapes to a run-down tank or other receiver through connection 20. Any uncondensed vapors and gases are withdrawn through connection 21.

Cooling water is supplied to the condenser box through connection 22 and overflows therefrom into a trough 23, which serves to maintain the level of the cooling water in the condenser box above the cooling coils, and escapes from the trough through connection 24. A pump 25 is arranged to withdraw a part of the water escaping through connection 24 and to introduce it through connection 26 into the receptacle 12 in which the cooling tubes 8 and 11 are immersed. A connection 27 is arranged to discharge any excess water from the receptacle 12 into the trough 23. The liquid level in the receptacle 12 may be regulated by the valve 28 in the connection 27, or the connection 27 may be left open and the point at which it connects to the receptacle 12 adjusted to automatically maintain the desired level therein. Excess water escaping from the trough 23 through connection 24 is discharged through connection 29.

In operation, the water level in the receptacle 12 is maintained at the approximate elevation of the top of the tubes 8 and 11. Water is supplied to this evaporative condenser from the overflow of the secondary condenser at a rate just sufficient to maintain the level in the receptacle 12 as the water is evaporated with the minimum of overflow therefrom necessary for practical control. Sufficient water is supplied to the secondary condenser to cool the condensed distillate to the desired temperature.

The hot vapors from the still first pass through the tubes 8 and 11 and cause evaporation of the relatively small volume of water maintained in the receptacle 12 and are thereby partially cooled. The steam generated in the receptacle escapes upwardly through the stack 13, and tends to promote the vaporization of the water in the receptacle 12 and consequently the cooling of the vapors in the tubes 8 and 11 by drawing a current of air in through the openings 14 which sweeps over the surface of the boiling water in the receptacle 12. The stack also tends to reduce the total pressure in the evaporating receptacle as well as to reduce the partial pressure of the water vapor by removing it as formed. The operation of the auxiliary condenser can be controlled within limits by regulating the flow of air over the surface of the water therein by means of the dampers 15.

The vapors escaping from an oil still comprise a mixture of constituents of various boiling points, and condensation, or vaporization, of the different constituents takes place over a range of temperatures rather than at a single definite temperature. Different constituents also have different specific heats as vapors and liquids and different heats of vaporization. The amount of heat which can be abstracted from the vapors by vaporizing water by heat interchange therewith accordingly varies with the character of the distillate as well as with the temperature of the vapors escaping from the still. The vaporization of the water in the evaporative condenser may, however, be employed to cool all of the vapors, and to condense, or partially condense, such constituents of the vapors as may be condensible at the temperatures to which the distillate is reduced by the evaporation.

I claim:

1. An improved method of cooling and condensing distillate vapors from oil stills, which comprises bringing the hot vapors escaping from the still into indirect heat exchanging relation with a relatively small volume of water maintained at its boiling point and vaporizing the water, passing a current of air in contact with said water to aid vaporization, and further cooling and condensing the distillate vapors by heat exchange with a relatively large volume of cooling water without substantial vaporization thereof.

2. An improved method of cooling and condensing distillate vapors from oil stills, which comprises bringing the hot vapors escaping from the still into indirect heat exchanging relation with a relatively small volume of water maintained at its boiling point and vaporizing the water, passing a current of air in contact with said water to aid vaporization, further cooling and condensing the distillate vapors by heat exchange with a relatively large volume of cooling water and flowing water from the second cooling and condensing treatment to the first.

3. An improved method of cooling and condensing distillate vapors from oil stills, which comprises bringing the hot vapors escaping from the still into indirect heat exchanging relation with a relatively small volume of water and vaporizing the water, passing a current of air in contact with said water to air vaporization, and subjecting the partially cooled distillate vapors to further cooling and condensation.

4. An improved method of cooling and condensing distillate vapors from oil stills, which comprises evaporating water by indirect heat interchange with the hot vapors escaping from the still, passing a current of air in contact with said water to aid vaporization, and subjecting the partially cooled distillate vapors to further cooling and condensation.

5. An improved method of cooling and condensing distillate vapors from oil stills, which comprises evaporating water by indirect heat interchange with the hot vapors escaping from the still, promoting the escape of the evaporated water by removing the water vapor as formed by means of natural draft, and subjecting the partially cooled distillate vapors to further cooling and condensation.

6. An improved method of cooling and condensing distillate vapors from oil stills, which comprises evaporating water by indirect heat interchange with the hot vapors escaping from the still, controlling the cooling effected by evaporation by regulating the passage of a current of air in contact with the water and thereby regulating the escape of the evaporated water and subjecting the partially cooled distillate vapors to further cooling and condensation.

7. An improved method of cooling and condensing distillate vapors from oil stills, which comprises evaporating water by indirect heat interchange with the hot vapors escaping from the still, maintaining a reduced pressure on the water undergoing evaporation by means of natural draft and subjecting the partially cooled distillate vapors to further cooling and condensation.

8. An improved method of cooling and condensing distillate vapors from oil stills, which comprises bringing the hot vapors escaping from the still into indirect heat exchanging relation with a relatively small volume of water and vaporizing the water, passing a current of air in contact with said water to aid vaporization, and further cooling and condensing the distillate vapors by heat exchange with a relatively large volume of cooling water at lower temperature.

9. In combination with an oil still, an evaporative condenser, connections for supplying water thereto, means for exposing said water to a current of air, a secondary condenser and means to cool the same, and connections for conducting distilled constituents from the still successively through the evaporative condenser and the secondary condenser.

10. In combination with an oil still, an evaporative condenser, a secondary condenser, connections for supplying cooling water to the secondary condenser and means for flowing water from the secondary condenser to the evaporative condenser, means for exposing said water to a current of air, and connections for conducting distilled constituents from the still successively through the evaporative condenser and the secondary condenser.

11. In combination with an oil still, an evaporative condenser, a secondary condenser, connections for supplying cooling water to the secondary condenser and means for flowing water from the secondary condenser to the evaporative condenser, means for exposing water in the evaporative condenser to a current of air to promote the escape of water vapor therefrom, and connections for conducting distilled constituents from the still successively through the evaporative condenser and the secondary condenser.

12. In combination with an oil still, an evaporative condenser comprising a receptacle and a vapor passage having an extended heat exchanging surface arranged therein, connections for supplying water thereto, means for exposing said water to a current of air and means for regulating the water level therein, a secondary condenser and means to cool the same, and connections for conducting distilled constituents from the still successively through the evaporative condenser and the secondary condenser.

13. In combination with an oil still, an evaporative condenser comprising a receptacle and a vapor passage having an extended heat exchanging surface arranged therein, connections for supplying water thereto and means for regulating the water level therein, a stack on said receptacle to promote the escape of water vapor therefrom, a secondary condenser and means to cool the same, and connections for conducting distilled constituents from the still successively through the evaporative condenser and the secondary condenser.

14. In combination with an oil still, an evaporative condenser comprising a receptacle and a vapor passage having an extended heat exchanging surface arranged therein, connections for supplying water thereto and means for regulating the water level therein, a stack on said receptacle to promote the escape of water vapor therefrom, dampers communicating with the atmosphere arranged in said receptacle above the water level therein, a secondary condenser and means to cool the same, and connections for conducting distilled constituents from the still successively through the evaporative condenser and the secondary condenser.

15. In combination with an oil still, an evaporative condenser comprising a receptacle and a vapor passage having an extended heat exchanging surface arranged therein, and means for regulating the water level therein, a secondary condenser, connections for supplying cooling water to the secondary condenser and means for flowing water from the secondary condenser to the evaporative condenser, means for exposing said water in the evaporative condenser to a current of air and connections for conducting distilled constituents from the still successively through the evaporative condenser and the secondary condenser.

16. In combination with an oil still, an evaporative condenser comprising a receptacle and a vapor passage having an extended heat exchanging surface arranged therein, a secondary condenser comprising a condenser box and cooling coils arranged therein, connections for supplying cooling water to the condenser box, a trough arranged to receive overflow from the condenser box, means for flowing water from said trough to the receptacle of the evaporative condenser, means for exposing said water in the evaporative condenser to a current of air, an overflow connection from said receptacle to said trough, and connections for conducting distilled constituents from the still successively through the said vapor passage and the said cooling coils.

In testimony whereof I affix my signature.

JOHN E. BELL.